(12) United States Patent
Neary

(10) Patent No.: US 8,760,633 B2
(45) Date of Patent: Jun. 24, 2014

(54) MEANS AND METHODS OF LASER MEASUREMENT FOR BOCCE

(76) Inventor: Joseph Neary, Mill Valley, CA (US)

( * ) Notice: Subject to any disclaimer, the term of this patent is extended or adjusted under 35 U.S.C. 154(b) by 252 days.

(21) Appl. No.: 12/927,538

(22) Filed: Nov. 16, 2010

(65) Prior Publication Data

US 2011/0116071 A1 May 19, 2011

Related U.S. Application Data

(60) Provisional application No. 61/262,858, filed on Nov. 19, 2009.

(51) Int. Cl.
| | |
|---|---|
| *G01C 3/08* | (2006.01) |
| *G01S 17/08* | (2006.01) |
| *G01S 17/88* | (2006.01) |
| *G01S 7/481* | (2006.01) |
| *A63B 67/06* | (2006.01) |

(52) U.S. Cl.
CPC ............. *G01S 7/481* (2013.01); *G01S 17/08* (2013.01); *G01S 17/88* (2013.01); *A63B 67/068* (2013.01)

USPC .................. 356/4.01; 356/5.01; 356/4.07

(58) Field of Classification Search
USPC ................. 356/3–22, 4.01, 4.07, 5.01
See application file for complete search history.

(56) References Cited

U.S. PATENT DOCUMENTS

| | | | |
|---|---|---|---|
| 6,847,436 B2 * | 1/2005 | Bridges | 356/4.02 |
| 7,956,988 B1 * | 6/2011 | Moran | 356/5.04 |
| 2003/0137674 A1 * | 7/2003 | Norita et al. | 356/601 |
| 2004/0049938 A1 * | 3/2004 | Bassolino et al. | 33/759 |
| 2004/0114129 A1 * | 6/2004 | Gogolla et al. | 356/4.01 |
| 2010/0259746 A1 * | 10/2010 | Ohnishi et al. | 356/4.01 |

* cited by examiner

*Primary Examiner* — Tarifur Chowdhury
*Assistant Examiner* — Michael P LaPage

(57) ABSTRACT

The invention generally relates to measurement systems. More particularly, the invention relates to means and methods of using laser technology to measure distances between balls used in playing bocce: wherein the present invention overcomes shortfalls in the related art by presenting an unobvious and unique combination and configuration of laser light, laser mounting methods, laser supporting methods, laser rotation methods and laser pivot points.

11 Claims, 3 Drawing Sheets

MEANS AND METHODS OF LASER MEASUREMENT FOR BOCCE

CROSS-REFERENCE TO RELATED APPLICATIONS

This application claims the benefit of U.S. Provisional Patent Application Ser. No. 61/262,858, filed 19 Nov. 2009

BACKGROUND OF THE INVENTION

(1) Field of the Invention

The invention generally relates to measurement systems. More particularly, the invention relates to means and methods of using laser technology to measure distances between balls used in playing bocce.

In order to better understand the principles of the invention, the understanding of various terms of art is helpful.

"pallino" a smaller ball used as a jack or target
"bocce" a larger ball thrown close to the target

BRIEF SUMMARY OF THE INVENTION

The present invention overcomes shortfalls in the related art by presenting an unobvious and unique combination and configuration of laser light, laser mounting methods, laser supporting methods, laser rotation methods and laser pivot points.

The accurate, precise, quick and consistent measurement of ball distance in the sport of bocce has eluded players of bocce for thousands of years. Previous measurement methods were prone to inaccuracies, game delay and arguments between players. Traditional tape measures and/or measurement strings were subject to human error as such measuring implements can be difficult to use in a bocce environment. One of the many problems in measuring the distance between a pallino and a bocce is the difference in ball size and the spherical shape of the pallino. Finding and measuring from the spherical outermost surface of the pallino can be difficult at best, and lead to player arguments and game delays at worst.

The present invention presents means and methods of placing a ball cover over a bocce, placing a laser support structure over the ball cover, such that the bocce is not moved or touched and such that the laser support provides level and rotational support to a laser apparatus. The laser apparatus may freely rotate over the pallino, and when necessary the laser apparatus may tilt in order to find and measure the closest point upon the measured bocce.

These and other objects and advantages will be made apparent when considering the following detailed specification when taken in conjunction with the drawings.

DETAILED DESCRIPTION OF EMBODIMENTS OF THE INVENTION

The following detailed description is directed to certain specific embodiments of the invention. However, the invention can be embodied in a multitude of different ways as defined and covered by the claims and their equivalents. In this description, reference is made to the drawings wherein like parts are designated with like numerals throughout.

Unless otherwise noted in this specification or in the claims, all of the terms used in the specification and the claims will have the meanings normally ascribed to these terms by workers in the art.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

Figure 1:
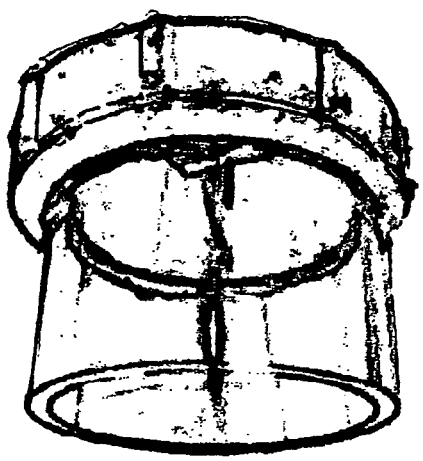
FIG. 1 is a perspective view of a ball cover.

Referring to FIG. 1, a cup and cover are shown. The cup is transparent in order to ensure that the cup does not touch an enclosed pallino. The top of the cup is attached to a cover. The cover assembly may rotate freely, secure a laser device. The cover may initially screw into the cup, and then have upper threads that allow for the level rotation of the cover.

Figure 2:
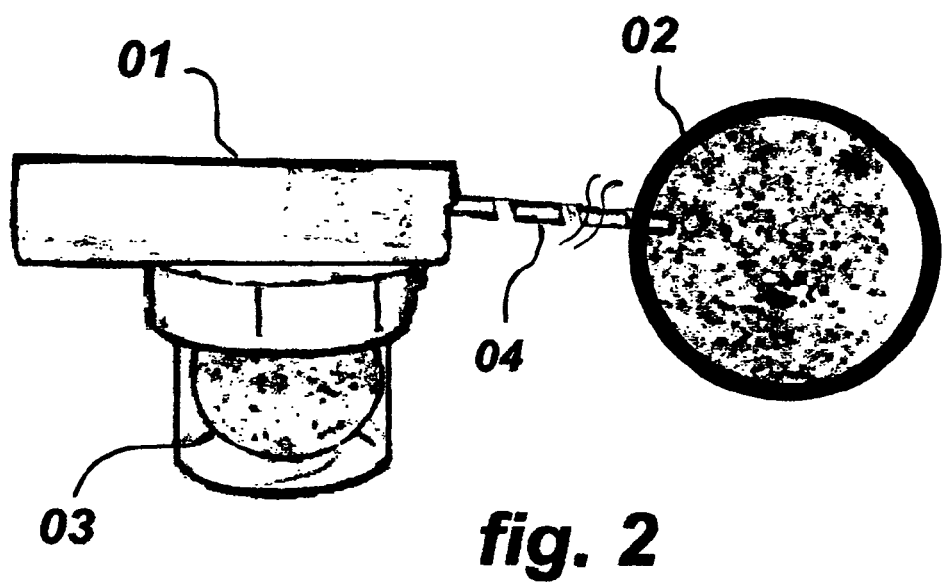
FIG. 2 is a perspective view of one embodiment of the invention placed upon a pallino and aimed toward a bocce.

Referring to FIG. 2 one embodiment of the invention is shown placed over a pallino. A dashed red line has been imposed from the laser to the adjacent bocce. A laser light is shown on the outer surface of the bocce. In FIG. 2 VELCROT™ "two strips of thin plastic sheets, one covered with tiny loops and the other with tiny flexible hooks" is used to allow the up and down or vertical tilting of the laser. But, other materials and methods are contemplated. 01 Laser unit. 02 The Bocce Ball. 03 Pollino. 04 Laser beam.

Figure 3:
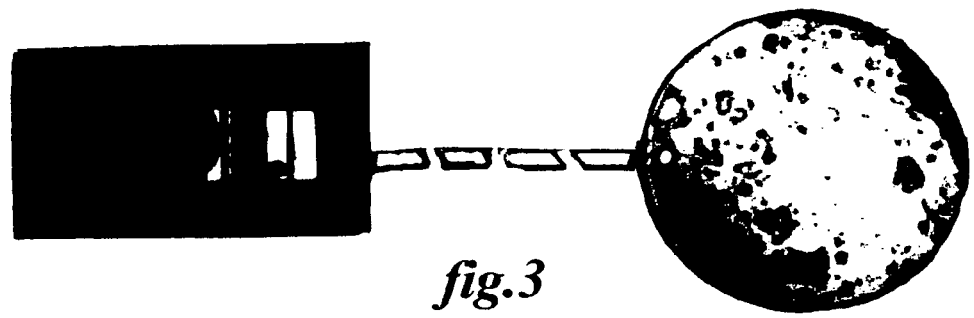
FIG. 3 is a top plan view of one embodiment of the invention measuring the distance from a pallino (left side) to a bocce (right side).

FIG. 3 shows a top plan view of an embodiment of the invention measuring an adjacent bocce. Various placement positions of the laser upon the cup cover are contemplated. For example, an off center placement is considered in light of mounting hardware convenience and in consideration of centering the laser over the mid section of the pallino.

Figure 4:
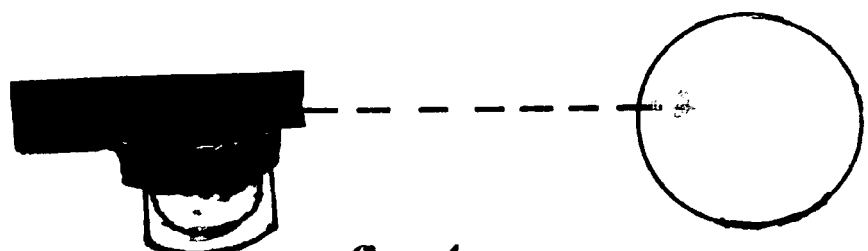
FIG. 4 is a side perspective view of one embodiment of the invention projecting a laser light upon a bocce.

FIG. 4 shows a side perspective view of a laser mounted upon a cap and cup. The transparency of the cup allows for a careful and precise centering of the cap over the pallino. In the rules of bocce, exceptional attention is paid to not touching the pallino during the measurement process.

Figure 5:
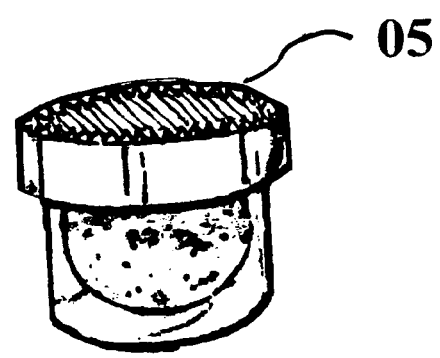
FIG. 5 is a side perspective view of a ball cover and bocce.

Referring to FIG. 5, a cup and cap are shown next to a bocce. The top surface of the cap is shown to be covered with VELCRO™. The use of VELCRO™ or other materials is contemplated in order to give the mounting mechanism means of pivoting upon the X axis or in an up and down motion. This pivot feature helps to compensate for any difference between the elevation of the laser and the elevation of the outer mid section of the measured bocce. 05 VELCRO™.

Figure 6:
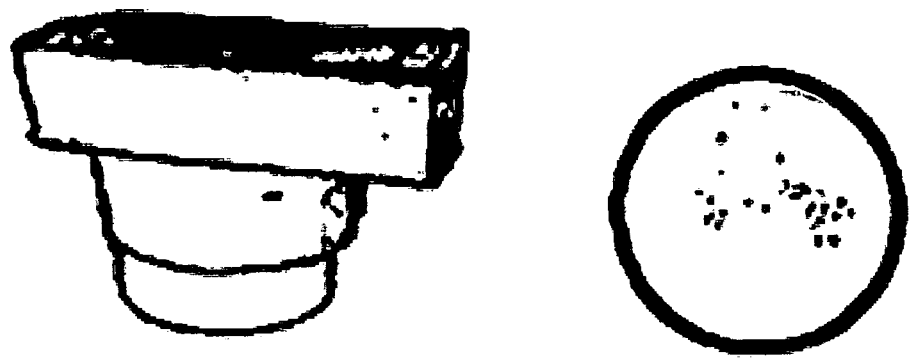
FIG. 6 is a side perspective view of an embodiment of the invention next to a pallino.

Referring to FIG. 6, an embodiment of the invention is shown on the left hand side while a pallino is shown on the right hand side. The proportions of the FIG. Help demonstrate that the cup is to be placed on top of the pallino.

Figure 7:
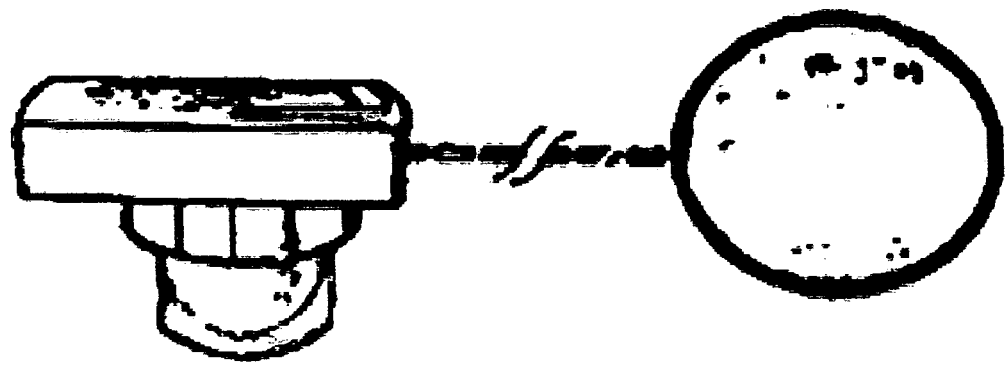
FIG. 7 is a side perspective view of an embodiment of the invention projecting a laser light upon a bocce.

FIG. 7 is a side perspective view of an embodiment of the invention projecting a laser light upon a bocce.

I claim:

1. A method for measuring a distance between a first ball and one or more target balls, comprising:
   placing a transparent cup over said said first ball, wherein said transparent cup does not touch said first ball,
   interlocking a cover on top of said transparent cup,
   securing a laser device to said cover, projecting a laser beam to said one or more target balls to measure the distance from said first ball to said one or more target balls.

2. The method of claim 1, wherein said interlocking further comprises interlocking an inner thread of said cover to an outer thread of said transparent cup to secure said cover to said transparent cup.

3. The method of claim 2, further comprising rotating an angular position of said cover relative to said transparent cup to allow said cover to freely rotate.

4. The method of claim 1, wherein said securing further comprises attaching said laser device to said cover with two strips of thin plastic sheets, one covered with tiny loops and the other with tiny flexible hooks.

5. The method of claim 4, further comprising securing said laser device to said cover to allow for tilting and pivoting in an up and down motion relative to said cover.

6. The method of claim 1, wherein determining said distance from said first ball to said one or more target balls is performed in seconds.

7. The method of claim 6, wherein determining said distance from said first object to said one or more target objects is performed by a single person.

8. The method of claim 1, further comprising determining a distance from said first ball to said one or more target balls is performed without touching either of said first ball or said one or more target balls.

9. A apparatus for measuring a distance between a first ball and one or more target balls, comprising:
   a transparent cup, wherein said transparent cup is placed over said first ball, wherein said transparent cup does not touch said first ball,
   a cover wherein said cover is interlocked to a top of said transparent cup, a laser device, wherein said laser device is secured to said cover and projects a laser beam, wherein said laser beam is projected from said laser device to said one or more target balls, and
   wherein the laser device further determines said distance between said first ball to said one or more target balls.

10. The apparatus of claim 9, wherein said transparent cup comprises an outer thread and said cover comprises an inner thread to interlock said cover to said transparent cup.

11. The apparatus of claim 9, further comprising two strips of thin plastic sheet, one covered with tiny loops and the other with tiny flexible hooks, to attach said laser device to said cover.

\* \* \* \* \*